United States Patent [19]

Ito

[11] Patent Number: 5,497,065

[45] Date of Patent: Mar. 5, 1996

[54] INVERTER OPERATION COMMAND PROCESS

[75] Inventor: Tomotaka Ito, Aichi, Japan

[73] Assignee: Mitsubishi Denki Kabushiki Kaisha, Tokyo, Japan

[21] Appl. No.: 236,885

[22] Filed: Apr. 26, 1994

Related U.S. Application Data

[63] Continuation of Ser. No. 945,248, Sep. 15, 1992, which is a continuation of Ser. No. 658,488, Feb. 20, 1991.

[30] Foreign Application Priority Data

Feb. 22, 1990 [JP] Japan .................................. 2-41499

[51] Int. Cl.[6] .............................. H02P 5/34; G05B 19/18
[52] U.S. Cl. ......................... 318/802; 318/798; 318/569; 364/188
[58] Field of Search .................................. 318/801, 802, 318/803, 800, 805, 807, 806, 798, 808, 567, 568.1, 569; 364/188, 178, 191, 474.28

[56] References Cited

U.S. PATENT DOCUMENTS 4,939,437  7/1990  Farag et al. ............................. 318/806

FOREIGN PATENT DOCUMENTS

| 0198248 | 10/1986 | European Pat. Off. . |
| 61-297030 | 5/1987 | Japan . |
| 64-26393 | 1/1989 | Japan . |
| 1026393 | 5/1989 | Japan . |

OTHER PUBLICATIONS

Mincberg, M., *WordPerfect®, Secrets, Solutions, Shortcuts,* McGraw Hill, 1987 p. 563.

*Primary Examiner*—John W. Cabeca
*Attorney, Agent, or Firm*—Sughrue, Mion, Zinn, Macpeak & Seas

[57] ABSTRACT

An operation command process for selecting and setting operation commands, such as frequency and voltage, for operating an inverter to control an induction motor. Multiple operation commands are individually defined. Then, the multiple operation commands are stored as a group in memory. The defining of the operation commands and storing them as an operation command group is repeated, each group corresponding to different application and load conditions of the induction motor, so that a plurality of operation command groups are stored in memory. One of the groups is selected and read from memory, and then used to operate the inverter to control the induction motor.

1 Claim, 7 Drawing Sheets

FIG. 4

| ADDRESS | DATA |
|---|---|
| 0 | |
| 1 | |
| 2 | |
| 3 | |
| --- | |
| 98 | |
| 99 | |
| 100 | |
| 101 | |
| 102 | |
| --- | |
| 198 | |
| 199 | |

SET 1 (addresses 0–99)
SET 2 (addresses 100–199)

FIG. 2

| 0 | 1 | 2 | F1 |
| 3 | 4 | 5 | F2 |
| 6 | 7 | 8 | G |
| 9 | . | R | W |

| NO. | OPERATION INFORMATION G1 | OPERATION INFORMATION G2 |
|---|---|---|
| 1 | TORQUE BOOST 5 (%) | TORQUE BOOST 8 (%) |
| 2 | MAXIMUM FREQUENCY 60 (Hz) | MAXIMUM FREQUENCY 60 (Hz) |
| 3 | MINIMUM FREQUENCY 1 (Hz) | MINIMUM FREQUENCY 1 (Hz) |
| 4 | V/F PATTERN 50 (Hz) | V/F PATTERN 50 (Hz) |
| 5 | HIGH SPEED 1600 (RPM) | HIGH SPEED 1600 (RPM) |
| 6 | MIDDLE SPEED 1000 (RPM) | MIDDLE SPEED 1000 (RPM) |
| 7 | LOW SPEED 400 (RPM) | LOW SPEED 400 (RPM) |
| 8 | ACCELERATION TIME 5 (SEC) | ACCELERATION TIME 5 (SEC) |
| 9 | DECELERATION TIME 10 (SEC) | DECELERATION TIME 10 (SEC) |
| 10 | DC DYNAMIC BRAKING 3 (Hz) | DC DYNAMIC BRAKING 3 (Hz) |

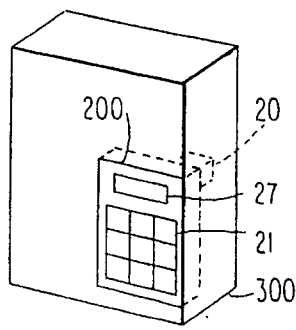
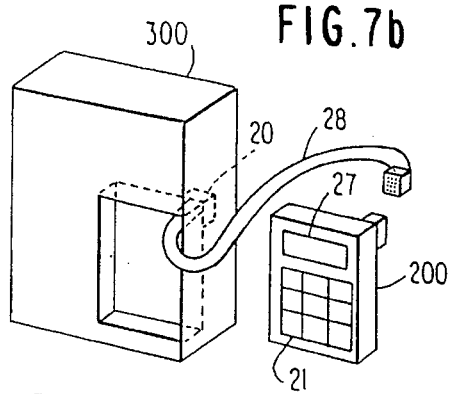

PRIOR ART
FIG. 8

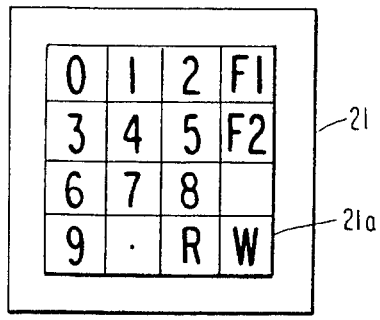

PRIOR ART
FIG. 9

| NO. | OPERATION INFORMATION |
|---|---|
| 1 | TORQUE BOOST |
| 2 | MAXIMUM FREQUENCY |
| 3 | MINIMUM FREQUENCY |
| 4 | V/F PATTERN |
| 5 | HIGH SPEED |
| 6 | MIDDLE SPEED |
| 7 | LOW SPEED |
| 8 | ACCELERATION TIME |
| 9 | DECELERATION TIME |
| 10 | DC DYNAMIC BRAKING |

PRIOR ART
FIG. 10

| NO. | OPERATION INFORMATION | |
|---|---|---|
| 1 | TORQUE BOOST | 5 (%) |
| 2 | MAXIMUM FREQUENCY | 60 (Hz) |
| 3 | MINIMUM FREQUENCY | 1 (Hz) |
| 4 | V/F PATTERN | 50 (Hz) |
| 5 | HIGH SPEED | 1600 (RPM) |
| 6 | MIDDLE SPEED | 1000 (RPM) |
| 7 | LOW SPEED | 400 (RPM) |
| 8 | ACCELERATION TIME | 5 (SEC) |
| 9 | DECELERATION TIME | 10 (SEC) |
| 10 | DC DYNAMIC BRAKING | 3 (Hz) |

PRIOR ART
FIG. 12
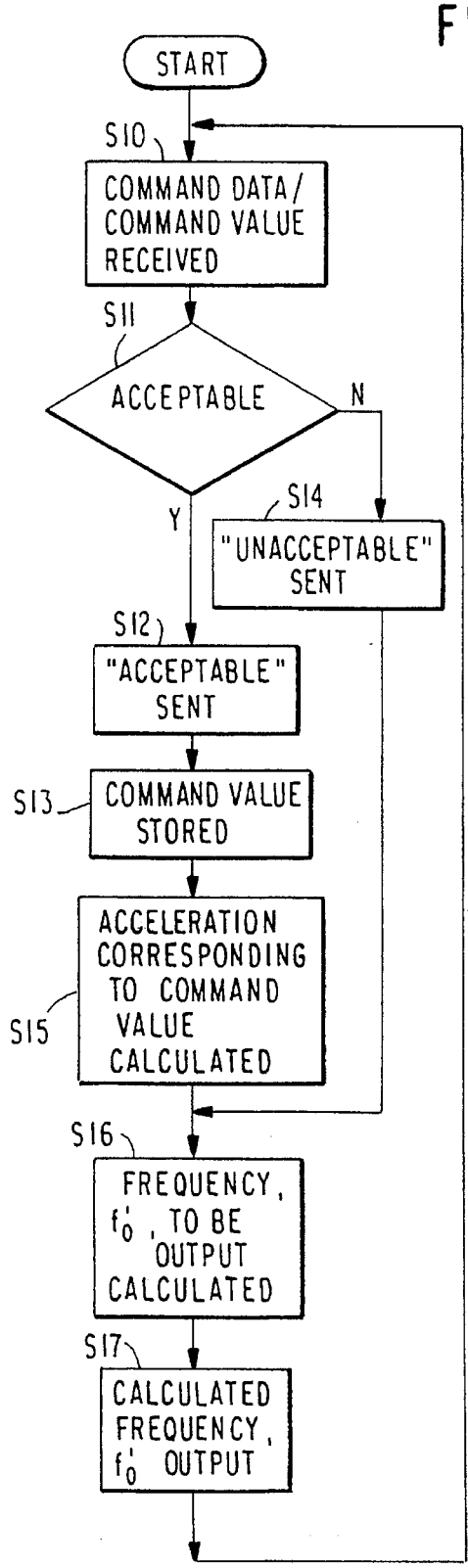
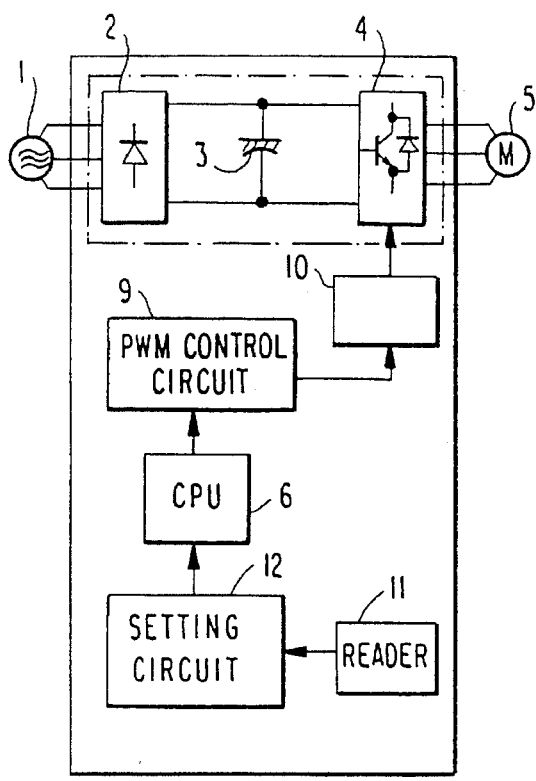
FIG. 13
PRIOR ART

1

INVERTER OPERATION COMMAND PROCESS

This is a continuation of application Ser. No. 07/945,248 filed Sep. 15, 1992, which is a continuation of application Ser. No. 07/658,488 filed on Feb. 20, 1991.

FIELD OF THE INVENTION

The present invention relates to an operation command process for selecting and setting operation commands, such as frequency and voltage, required to operate an induction motor controlled by an inverter unit.

BACKGROUND OF THE INVENTION

FIG. 6 is a block diagram illustrating a conventional inverter operation command unit disclosed in Japanese Patent Disclosure Bulletin No. 1989-26393. In FIG. 6, the numeral (1) indicates a three-phase alternating-current (AC) power supply, (2) a converter circuit (rectifying circuit) for converting a three-phase AC voltage output by the three-phase power supply (1) into a direct-current (DC) voltage, (3) a smoothing capacitor, (4) an inverter circuit for converting the DC voltage into an AC voltage of a predetermined frequency by on/off switching six switching elements at determined timing (i.e., a PWM control pattern), and (5) an induction motor driven at the AC voltage of the inverter circuit (4). The inverter operation command unit is divided into an operation command device (200) and an inverter control circuit (300) connected by a connector (20). The operation command device (200) comprises keys (21), a keying-in means (22), a command data/command value judging means (23), a sending means (24), a receiving means (25), a display data output means (26), and an alphanumeric character display board (27). The inverter control circuit (300) comprises the converter circuit (2), the smoothing capacitor (3), the inverter circuit (4), a command value acceptance judging means (31), a nonvolatile memory (hereinafter referred to as the "EEROM") allowing stored data to be electrically written and erased (32), and an inverter operation means (hereinafter referred to as the "base amplifier circuit") (33). The keying-in means (22), a command data/command value judging means (23), the sending means (24), the receiving means (25) and the command value acceptance judging means (31) are functions generated by executing a predetermined operation program by means of a microprocessor (not illustrated) and are indicated as shown in FIG. 6 to simplify the description.

As indicated in an outside view, FIG. 7, the inverter operation command unit allows the operation command device (200) to be removed from and reconnected to the inverter control circuit (300). The operation command device (200) and the inverter control circuit (300) may be connected using a long cable (28).

FIG. 8 illustrates details of the button keys (21), wherein operation commands necessary to control the induction motor (5) by means of the inverter unit will be described by way of example. In this case, the inverter unit is employed to control the speed of the induction motor (5) by setting the individual operation commands indicated in FIG. 9 to optimum values in consideration of the load characteristics, such as the machine, connected to the induction motor (5) and those of induction motor (5) itself.

For example, operation command No. 1 "torque boost" indicated in FIG. 9 is used to adjust the output torque of the induction motor (5) and allows ten incremental settings e.g.,

2

1 to 10. The operation commands No. 2 "maximum frequency" and No. 3 "minimum frequency" are used to specify upper and lower limit values of the speed of the induction motor (5), respectively, and allow speeds to be set within predetermined ranges, for example between 60 Hz=1800 rpm and 10 Hz=300 rpm (if the number of induction motor poles is four). Similarly, the other operation commands shown in FIG. 9 can be set within predetermined ranges. The operation commands indicated in FIG. 9 are only some of the commands available, which are nearly 100 in number because of the enhanced functions of the inverter unit. In order to ensure ease of setting such a large number of operation commands, the inverter unit allows command numbers corresponding to the operation commands to be entered and set from the keyboard (21a) having button keys (21).

In the keyboard (21a) shown in FIG. 8, numeral keys 0 to 9 are used to set a command number or operation command data. "." is a decimal point employed when setting the operation command data. "F1" is used to indicate that the following command number is one digit in length. "F2" is used when the command number is two digits in length. "W" is used to set data corresponding to a given command number. "R" is employed to read set data corresponding to a given command number.

Control using the button keys (21) will now be described.

For instance, the keystrokes for changing a set value, e.g., 5, of operation command number 1 "torque boost" (see FIG. 9) to a new value, e.g., 8, are as follows:

| "F1" "1" "R" | "5" is displayed on the alpha-numeric display board (27). |
|---|---|
| "8" | "5" changes to "8" on the alpha-numeric display board (27). |
| "W" | Data of command 1 changes to "8". |

In the above, "F1" indicates that the command number is a one-digit number, while "1" is the command number. "R" commands a readout of the current value for the parameter, which is then changed by entry of another value, here "8". Finally, "W" commands a rewriting of the entered value "8".

In setting the data for operation command number 10 "DC dynamic braking", the setting and calling methods are the same as above with the exception that "F2" is used instead of "F1" because the command number is two digits in length:

| "F2" "1" "R" | The previously set data is displayed on the alphanumeric display board (27). |
|---|---|

According to the above example, 100 operation commands, 0 to 99, can be provided. The set data is processed by the command data/command value judging means (23), the sending means (24) and the command value acceptance judging means (31), and stored in the EEROM (32). The EEROM (32) is provided with memory spaces in correspondence with the command numbers. The command data stored in the EEROM (32) is rewritten or read by decoding an instruction from the keyboard (21a) by means of the command data/command value judging means (23), the sending means (24) and the command value acceptance judging means (31).

That is, the operation commands are set as shown in FIG. 10, e.g., operation command No. 1, torque boost, is set to "5 (%)," operation command No. 2, maximum frequency, to "60 (Hz)," . . . In some cases up to 100 operation commands are set. These set operation commands are integrated into an operation command group as operation command information, which is used to operate a particular induction motor (5). FIG. 10 shows a set operation command group composed of various operation commands. Any of these commands can be called and displayed on the alphanumeric display panel (27) by entering the required data from the keyboard (21a).

Operation of the conventional inverter operation command unit is described below with reference to the flowcharts in FIGS. 11 and 12. FIG. 11 is a flowchart illustrating operation of the operation command device (200), and FIG. 12 is a flowchart showing operation of the inverter control circuit (300).

(1) Steps S1 and S2

When the power is switched on, the keying-in means (22) waits for any of the button keys (21) to be pressed. When a key on the keyboard (21a) is pressed, the keying-in means (22) judges whether the key pressed relates to command data, command value or command write.

(2) Steps S3 to S6

When the key pressed relates to command data or command value, the command data/command value judging means (23) judges the command data or the command value of that key. (steps S3 and S4) The display data output means (26) displays the command data or the command value judged by the command data/command value judging means (23) on the alphanumeric character display board (27). (step S5)

If the keys are set in advance to correspond to the operation commands as described previously, e.g., key "8" of the keyboard (21a) is for acceleration time and key "9" for deceleration time, pressing the key "8" (after pressing "F1") causes the command data/command value judging means (23) to judge that the operation command of interest is the acceleration time, thus (after pressing "R") the acceleration time is displayed. The display enables a user to confirm that the command value is correct or that a new value has been accepted so that the user may then move on to the next command data or command value. An example of command interpretation, when the previously entered command data is concerned with the acceleration time, the command data/command value judging means (23) judges the entered command value to be the length of time from a stop state to a maximum output frequency. Therefore, if a command value "5" is entered, the length of time between the stop state and the maximum output frequency is set to 5 seconds.

When the user confirms the acceptance of the command value from the display and presses the command write key, which is then confirmed by the command data/command value judging means (23), the sending means (24) transmits the operation command data and the command value, e.g., acceleration time of 5 seconds, to the inverter control circuit (300). (step S6)

(3) Steps S10 to S14

Upon receiving the command from the sending means (24) (step S10), the command value acceptance judging means (31) of the inverter control circuit (300) judges whether the induction motor (5) may be operated in accordance with the command data and command value (step S11). If operation may be performed according to the command received, the command value acceptance Judging means (31) transmits an "acceptable" message to the receiving means (25) of the operation command device (200) (step S12) and also stores the operation command data and command value in the EEROM (32) (step S13). If the operation cannot be performed according to the command received, the command value acceptance judging means (31) transmits an "unacceptable" message to the receiving means (25) (step S14).

(4) Steps S7 to S9

After the receiving means (25) has received the command data and command value "acceptable" or "unacceptable" message, the display data output means (26) judges whether the induction motor (5) can be operated (step S7), and displays on the alphanumeric character display board (2) whether the command can be executed (step S8) (step S9). When the command can be executed, the alphanumeric character display board (2) flickers the command data and the command value alternately to indicate that the command is executable. When the command cannot be executed, the alphanumeric character display board (2) flickers the command number and an error display alternately to indicate that the command is unexecutable.

(5) Step S15

When the induction motor (5) is capable of operating in accordance with the command data and the command value received, the inverter control circuit (300) controls the operation of the induction motor (5). In controlling the operation, the inverter control circuit (300) calculates acceleration, $a(f_0)$ (c/s$^2$), at frequency, $f_0$ (Hz:c/s), in accordance with the acceleration time, t, and operates the induction motor (5) according to those command values. For example, if the acceleration time of 5 seconds has been entered, the inverter control circuit (300) calculates the acceleration, $a(f_0)$, at the frequency $f_0$, for the acceleration time of 5 seconds. Assuming that a maximum output frequency is $f_{max}$, the acceleration, $a(f_0)$ is denoted by the following expression:

$$a(f_0) = \frac{f_{max} - (0\ Hz)}{5} \quad (\text{unit: c/s}^2)$$

where, "0 Hz" indicates that the induction motor (5) is at a stop.

(6) Steps S16 and S17

The inverter control circuit (300) calculates frequency, $f_0'$, which should be output t seconds after the command value, $f_0$, is output, according to the following expression (step S16):

$$f_0' = f_0 + a(f_0)\Delta t$$

The calculated frequency, $f_0'$ is output as a new output frequency (step S17). Further, t' seconds after the frequency, $f_0'$, is output the inverter control circuit (300) calculates frequency, $f_0''$, according to the following expression:

$$f_0'' = f_0' + a(f_0')\Delta t$$

The inverter control circuit (300) outputs the calculated frequency repeatedly and accelerates the induction motor (5) within the entered acceleration time (step S17).

By repeating the above operations, multiple operation commands can be keyed in, and the commands executed as required.

Usually, the command values of the inverter unit vary depending on the application. Even if the application is the same, the values must also be set according to the load condition. Hence, the user of the inverter unit must set each command value, requiring a change from the initial preset value, in accordance with the application and/or load conditions. Therefore, the user must alter many command data settings every time the application and/or the load conditions change.

In contrast to the above mentioned conventional unit which stores various operation commands in EEROM (32), some conventional units store the operation commands in a magnetic storage medium (e.g., a magnetic card). Japanese Utility Model Disclosure Bulletin No. 1989-6796 discloses a unit that employs a magnetic card for storing and reading values of various operation commands by means of a card reader and a read circuit installed on the inverter. FIG. 13 shows a block diagram of the aforementioned conventional unit which includes a three-phase AC power supply (11), a converter circuit (2) for converting a three-phase AC voltage output by the three-phase AC power supply (1) into a DC voltage, a smoothing capacitor (3), an inverter circuit (4), a microcomputer 6), a PWM control circuit (9), a base drive circuit (1), a reader (11) for reading set values from the magnetic card, and a setting circuit (12) for outputting various set values.

Operation of the conventional unit will now be described with reference to FIG. 11. The reader (11) reads the operation values stored on the magnetic card and outputs signals to the setting circuit (12), which then provides the signals entered by the reader (11) to the microcomputer (6). When entry of the set values from the setting circuit (12) is complete, a start signal is provided from outside the inverter, and the microcomputer (6) performs program processing in accordance with the set values and drives the PWM control circuit (9).

The operation command process of the conventional inverter operation command unit not only requires a lot of time to set commands but can also result in setting faults since the data for many operation commands must be rewritten every time the application or load conditions of the inverter unit change. Moreover, when re-setting the commands for prior application or load conditions, the previous set values must simply be recorded on paper, resulting in a complicated work process. Although one conventional unit uses a storage medium, such as a magnetic card, as a means of simultaneously changing and storing multiple operation commands set in accordance with the application and load conditions, the cost of the equipment required is significant, e.g., the reader (11) will significantly increase the price of the operation command unit.

SUMMARY OF THE INVENTION

It is, accordingly, an object of the present invention to overcome the disadvantages in the conventional unit by providing an inverter operation command process which will allow data to be easily read and rewritten in accordance with the application and load conditions of the inverter unit.

The foregoing object is accomplished in one embodiment by providing an inverter operation command process which utilizes the following steps: setting individually, multiple sets of operation commands required for the operation of an induction motor by means of an operation command input unit; storing a set of operation commands as a group into memory; and selecting and reading any of the multiple sets of operation command information from the said storage means for operation of the induction motor.

According to the present invention, the inverter operation command process individually sets multiple sets of operation commands required for the operation of the induction motor, stores operation command groups composed of sets of operation commands as single pieces of operation command information in the storage means, and reads any of the operation commands groups from the storage means for operation of the induction motor.

BRIEF DESCRIPTION OF THE DRAWINGS

FIG. 2 is a detailed view of button keys according to one embodiment of the present invention.

FIG. 3 shows an operation command group according to one embodiment of the present invention.

FIG. 4 is a general view of memory space according to one embodiment of the present invention.

FIG. 7 is an outside view of the inverter operation command unit shown in FIG. 6.

FIG. 8 is a detailed view of button keys of the inverter operation command unit shown in FIG. 6.

FIG. 9 indicates operation information for use with the conventional inverter operation command process.

FIG. 10 shows an operation command group according to the conventional inverter operation command process.

FIGS. 11 and 12 are flowcharts illustrating operation of the inverter operation command unit shown in FIG. 6.

FIG. 13 is a block diagram of the inverter unit according to the conventional inverter command process.

Figure 1:
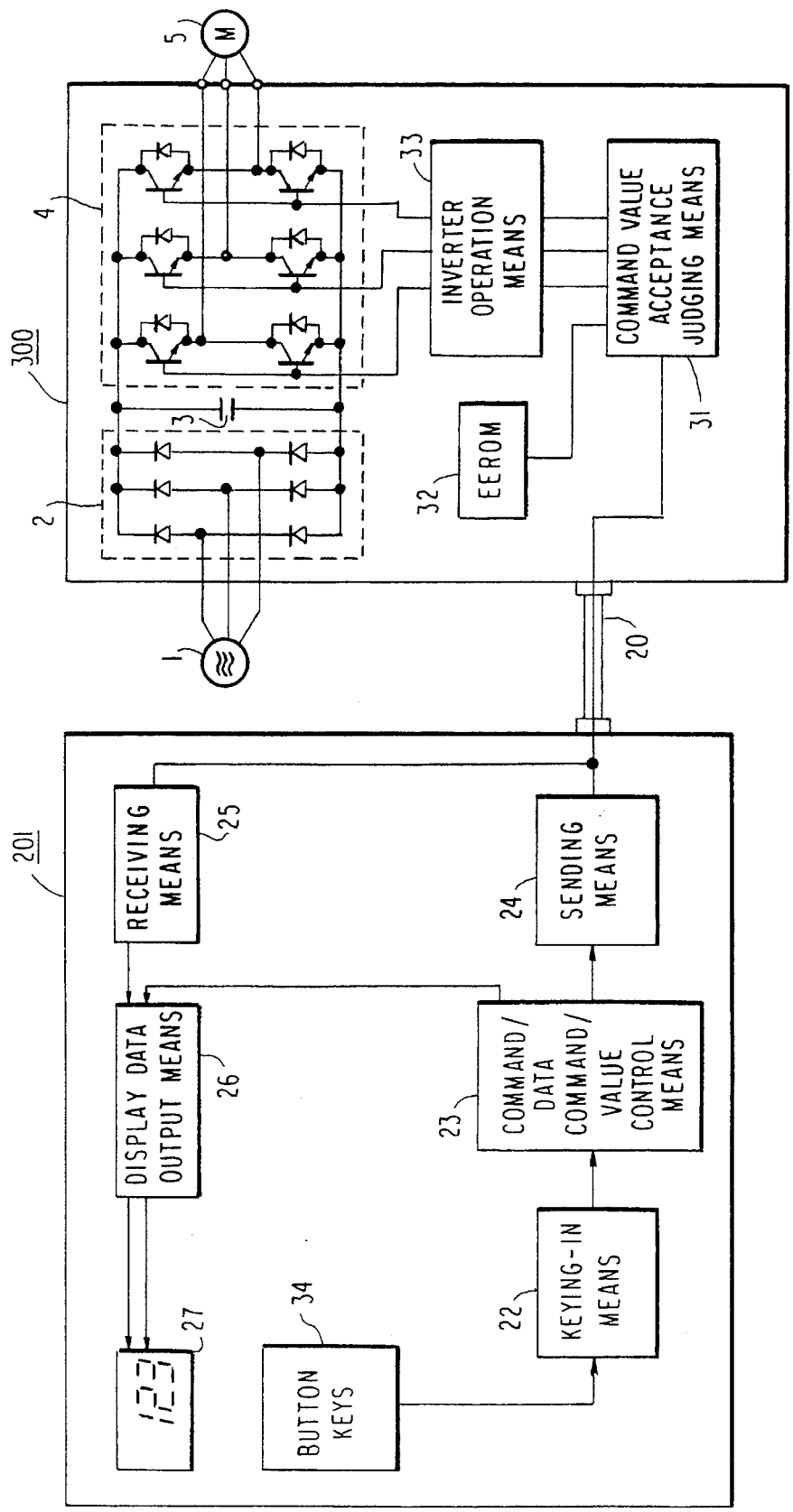
FIG. 1 is a block diagram of an inverter operation command unit according to one embodiment of the present invention.

In the foregoing drawings, wherein like reference characters designate like or corresponding parts throughout the several views, the numeral (1) indicates a three-phase AC power supply, (2) a converter circuit, (3) a smoothing capacitor, (4) an inverter circuit, (5) an induction motor, (22) a keying-in means, (23) an operation command data/command value judging means, (24) a sending means, (25) a receiving means, (26) a display data output means, (27) an alphanumeric character display board, (31) a command value acceptance Judging means, (32) a storage means (EEROM), (33) an inverter operation means, (34) button keys, (201) an operation command device, and (300) an inverter control circuit.

DESCRIPTION OF THE PREFERRED EMBODIMENT

An embodiment of the present invention will now be described with reference to the drawings. Referring to FIG. 1, the numeral (201) indicates an operation command device and (300) an inverter control circuit identical to the one in the conventional unit, which are connected by a connector (2). The operation command device (201) comprises a keying-in means (22) for writing into EEROM (32) data entered by pressing button keys (34), an operation command data/command value judging means (23) for judging the contents of command values, a sending means (24), a receiving means (25), a display data output means (26) and an alphanumeric character display board (27). The keys (34)

and the keying-in means (22) comprise an operation information inputting means, and the inverter control circuit (300) including the EEROM (32) as a storage means is identical to the one employed in the conventional unit. The keying-in means (22), the command data/command value judging means (23), the sending means (24), the receiving means (25) and the command value acceptance judging means (31) may be implemented by executing a predetermined operation program using a microprocessor (not illustrated).

FIG. 2 is a detailed view of the keys (34). A "G" key not included in the keyboard (21a) of the conventional unit illustrated in FIG. 8 is provided.

Operation of the button keys (34) will now be described. With the keyboard (34a) shown in FIG. 2, the method for setting individual operation commands according to application and load conditions of the inverter unit is identical to that in the conventional unit and will not be further explained here.

After entering a given set of individual operation commands, the following keys are pressed:

"G" "1" "W"

Where "G" designates a "group" operation, "1" is the group number and "W" indicates, as before, a write operation. This stores the values of the operation commands, such as torque boost, maximum frequency, minimum frequency and V/F pattern, corresponding to the current application and load conditions, as a set of values required for this operation. Namely, the entire operation command group is set as a single piece of operation command information corresponding to particular purpose and load. FIG. 3 shows operation command groups G1 and G2 composed of various operation commands and command values.

If the application purpose and load conditions of the inverter unit change, corresponding operation command data may be again input or various values may be altered. After completion of the setting, the following keys are pressed:

"G" "2" "W"

By this operation, a second operation command group including the modified operation commands is set as a new operation command group separately from the previously entered operation command group and is stored in the EEROM (32).

The operation command group thus set is operation command group G2 as shown in FIG. 3.

If it is subsequently desired to operate the inverter unit for the same application and with the same load conditions as previously, the following keys are pressed, assuming that the values of group "1" are applicable to the conditions:

"G" "1" "R"

This reads and sets the previously set operation command group, i.e., operation command group G1, from the EEROM (32), which has memory space sectioned corresponding to the command numbers. The command, e.g., G 1 R, entered by the user from the keyboard (34a) is decoded by the command data/command value judging means (23), the sending means (24) and the command value acceptance judging means (31). Then the corresponding operation command group stored in the EEROM (32) is read.

The aforementioned memory space of the EEROM (32) will now be described. FIG. 4 is a general view of the memory space of the EEROM (32), wherein addresses 0 to 99 are used to store data corresponding to up to 100 operation commands set in correspondence with a first application and load conditions. That is, addresses 0–99 are employed as a data area for the operation command group G1.

Addresses 100 to 199 are employed to store data for up to 100 operation commands set corresponding to a second application purpose or load conditions. Namely, these addresses are employed as a data area for operation command group G2.

Figure 5:
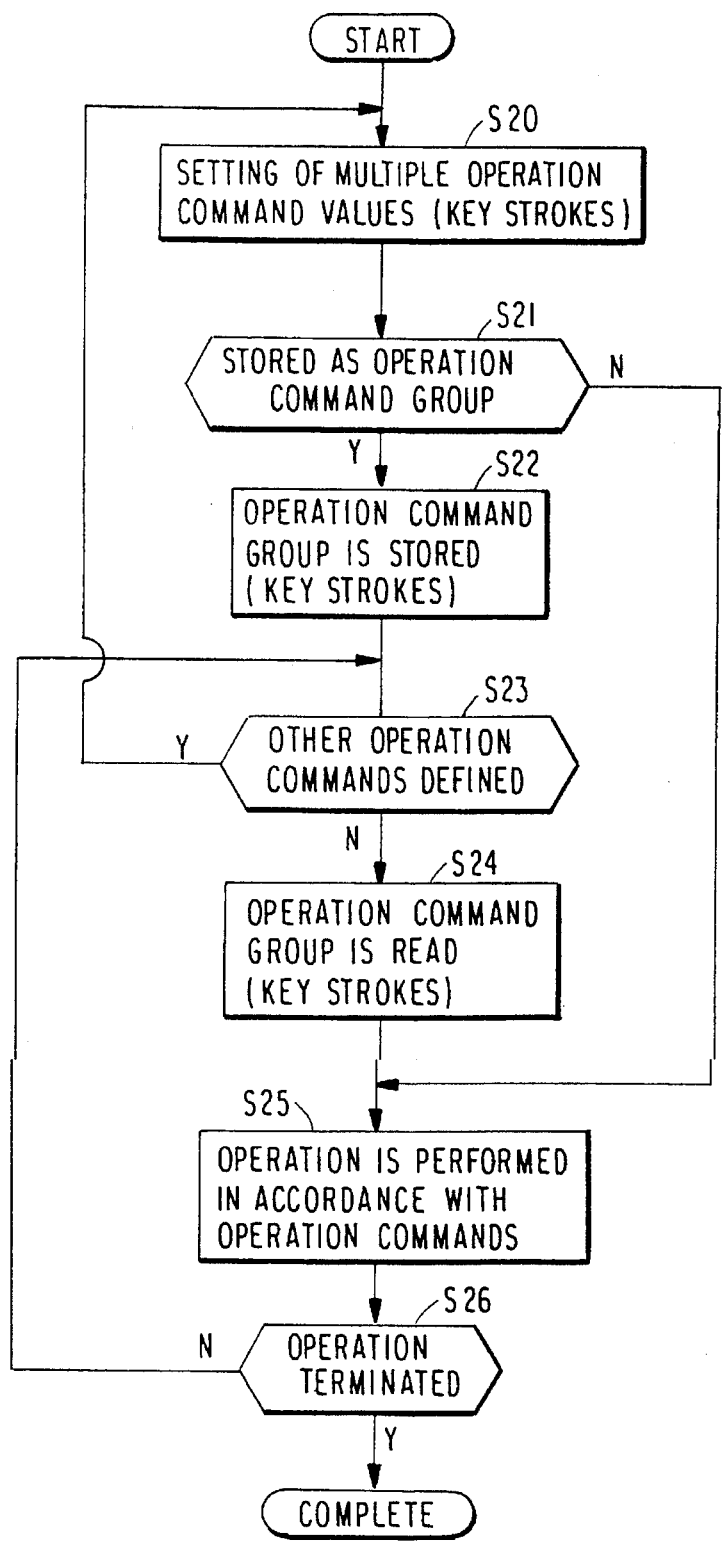
FIG. 5 is a flowchart illustrating an operation command process according to one embodiment of the present invention.
Figure 6:
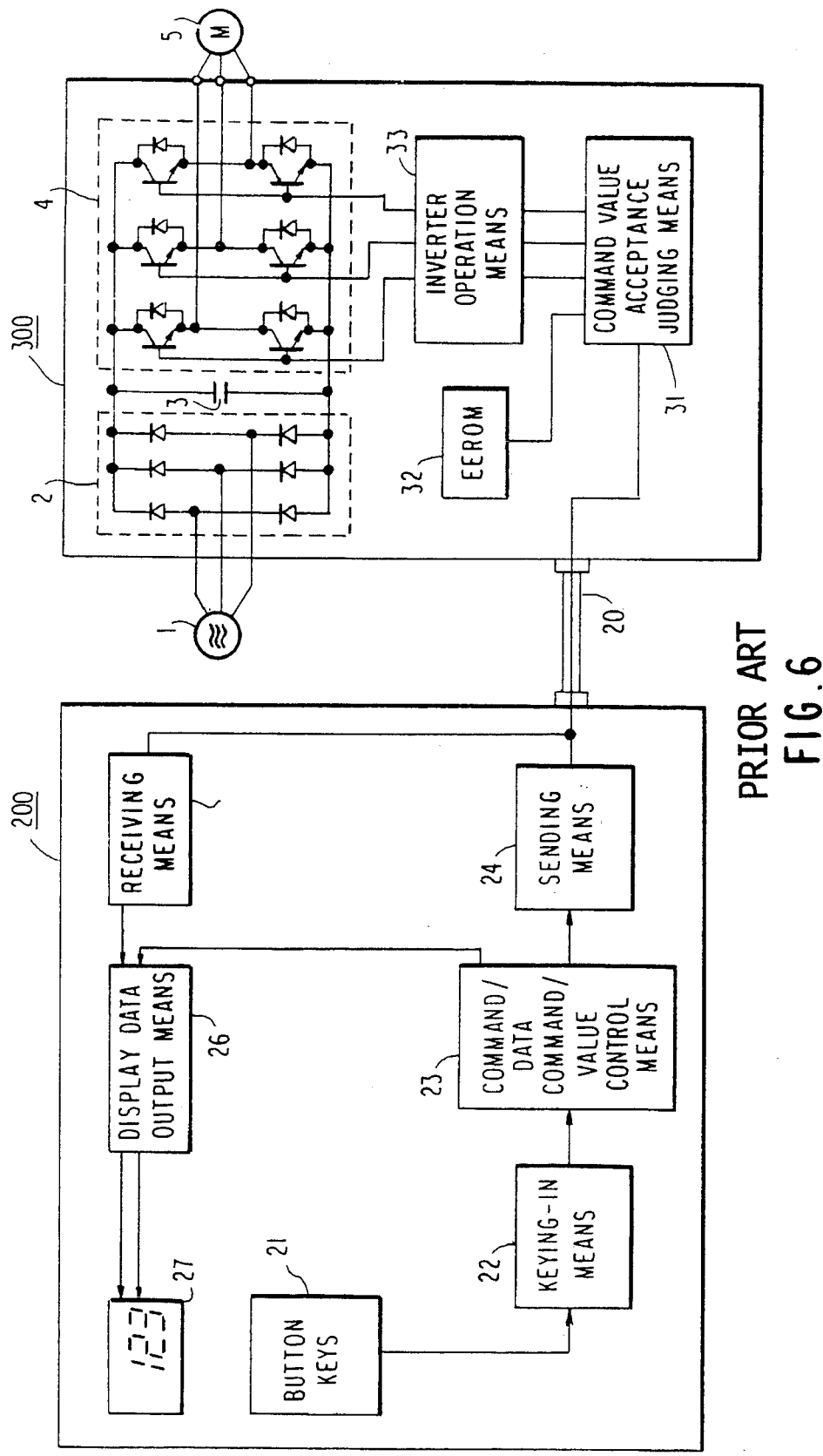
FIG. 6 is a block diagram of an inverter operation command unit according to the conventional inverter command process.

One example of the setting and use of multiple command sets will now be described with reference to the flowchart in FIG. 5.

(1) Step S20

Figure 11:
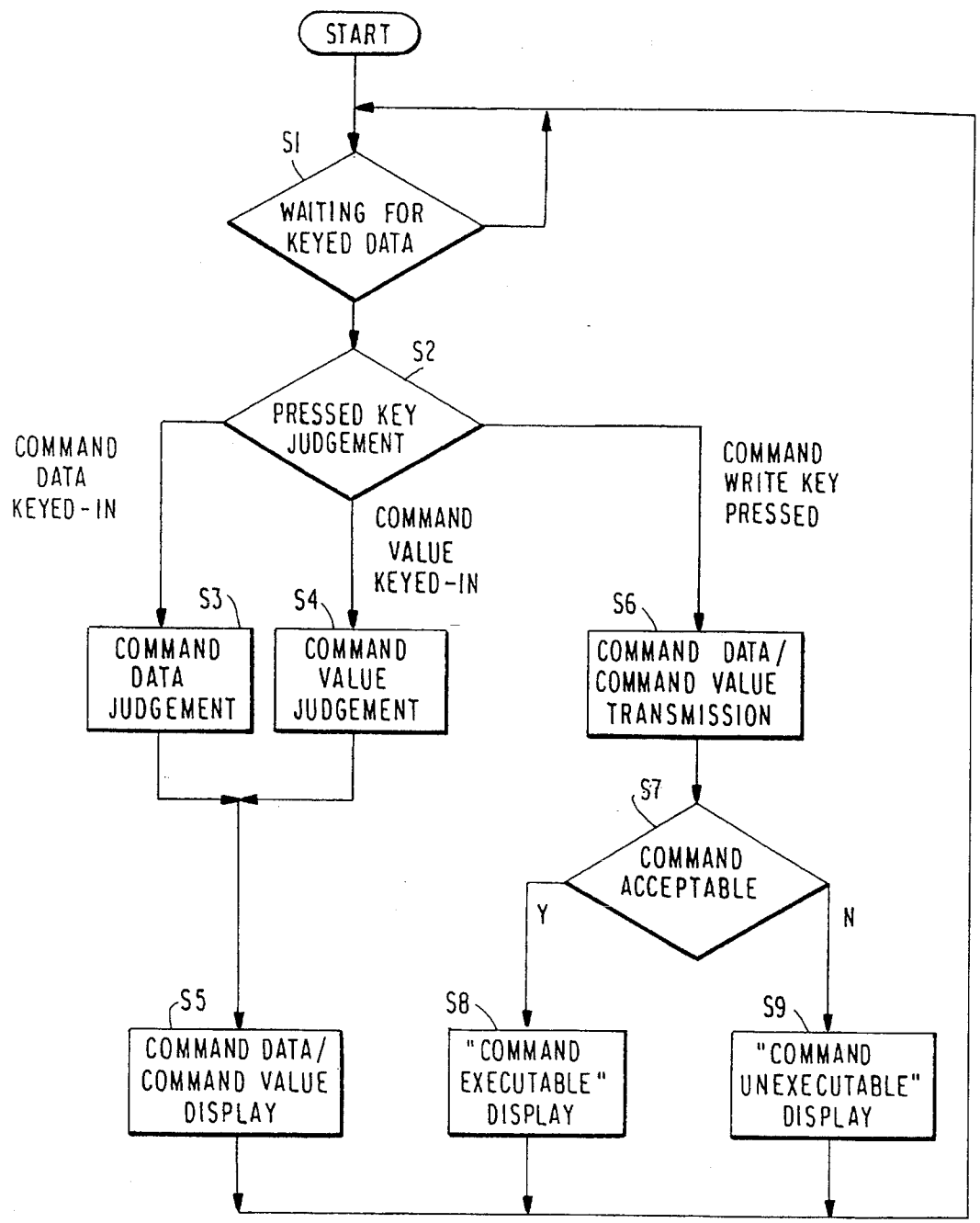

Multiple operation commands required for the operation of the induction motor (5) are defined individually with the button keys (34). Namely, step S20 is equivalent to steps S1 to S9 in FIG. 11.

(2) Steps S21, S22

Whether the operation commands defined at step S20 will be stored as an operation command group is determined. If they are to be stored as an operation command group, the operation moves to step S22 and keys "GnW" of the keyboard (34a) are pressed, e.g., according to the above described embodiment. Although "n" is not indicated it is an integer value 0, 1, 2, 3, . . . and corresponds to the address in the EEROM (32) for storing the operation command group.

When it is not necessary to store the operation commands as an operation command group, the execution advances to step S25 to effect operation similar to that in the conventional unit.

(3) Step S23

Whether an operation command group having different set values from that of the operation command group already defined and stored will be defined is determined. In this case, steps S20 and thereafter are repeated. At step S20, the command values are stored in the EEROM (32) at addresses different from those employed for the operation command group or groups already stored.

(4) Step S24

Here, an operation command group already stored may be read. As described alone, the keys "G n R" are pressed to call up the relevant set of commands.

(5) Step S25

The induction motor (5) is operated in accordance with the operation commands defined at the step S20 or the operation commands read at the step S24.

(6) Step S26

Whether the operation is to be terminated is determined. In case it is necessary to operate the induction motor (5) in other load conditions, the operation returns to step S23, where the operation can change the operation command values, and resume operation.

While the EEROM divides its memory space in correspondence with the command value sets in the above embodiment, only that data which differs from set 1 may be stored in areas for set 2 and subsequent data sets to economize on memory capacity.

According to the invention, if the operation information is to be re-set for the same application purpose and load conditions, re-setting may be performed without needing to record previously set values on paper, by reading and recording the values in batches.

Further, since the sets of operation commands are entered into the storage means, the present invention provides an easily operated inverter operation command process, which allows the unit itself to be constructed at low cost without requiring a special reader to be installed separately for reading a magnetic card or the like.

It will be apparent that the invention, as described above, achieves an inverter operation command process that will allow operation commands to be re-set in a short period of time and prevent faulty setting. This is accomplished by a process that employs an operation command group composed of the multiple operation commands required for the operation of the induction motor as one piece of operation command information, stores multiple operation command groups in the storage means, and reads a desired operation command groups from the storage means for the operation of the induction motor.

What is claimed:

1. A process for controlling the operation of an inverter and an associated motor, comprising the steps of:

setting, by a user controlling an operation command input means, one or more of a plurality of individual operation commands to a user-defined value required for operation of the motor controlled by said inverter;

storing said one or more of the plurality of the individual operation commands in a storage means as an operation command group, at selected addresses in said storage means;

repeating said setting and storing steps to store a plurality of operation command groups;

selecting an operation command group from among said plurality of operation command groups stored in said storage means;

reading said selected operation command group from said storage means; and operating said inverter to control said motor in accordance with said selected operation command group; said process further comprising the steps of:

modifying, in whole or in part, one or more of the individual operation commands in said selected operation command group; and storing said modified operation command group in said storage means as a new operation command group at one of the same addresses as those of the individual operation commands prior to being modified and different addresses from those of said selected operation command group; wherein said plurality of operation command groups stored in the different addresses are selected in correspondence to different application purposes and load conditions of said motor.

* * * * *